(12) United States Patent
Huggins et al.

(10) Patent No.: US 12,645,972 B2
(45) Date of Patent: Jun. 2, 2026

(54) PERFORMING PROPERTY ESTIMATION USING QUANTUM GRADIENT OPERATION ON QUANTUM COMPUTING SYSTEM

(71) Applicant: Google LLC, Mountain View, CA (US)

(72) Inventors: Bill Huggins, Oakland, CA (US); Jarrod Ryan McClean, Los Angeles, CA (US)

(73) Assignee: GOOGLE LLC, Mountain View, CA (US)

( * ) Notice: Subject to any disclaimer, the term of this patent is extended or adjusted under 35 U.S.C. 154(b) by 867 days.

(21) Appl. No.: 17/970,943

(22) Filed: Oct. 21, 2022

(65) Prior Publication Data

US 2023/0126123 A1 Apr. 27, 2023

Related U.S. Application Data

(60) Provisional application No. 63/270,877, filed on Oct. 22, 2021.

(51) Int. Cl.
G06N 10/60 (2022.01)
G06N 10/20 (2022.01)

(52) U.S. Cl.
CPC ............. G06N 10/60 (2022.01); G06N 10/20 (2022.01)

(58) Field of Classification Search
CPC ........ G06N 10/60; G06N 10/20; G06N 10/40; B82Y 10/00
See application file for complete search history.

(56) References Cited

U.S. PATENT DOCUMENTS

| | | | | |
|---|---|---|---|---|
| 2019/0156242 A1* | 5/2019 | Haener | ................. | H04L 9/0852 |
| 2019/0266508 A1* | 8/2019 | Bunyk | ................ | G06F 11/0736 |
| 2022/0188679 A1* | 6/2022 | Mazzola | ................ | G06Q 40/04 |
| 2022/0215967 A1* | 7/2022 | Zhao | ....................... | G06N 10/60 |
| 2022/0335325 A1* | 10/2022 | Dallaire-Demers | ... | G06N 10/60 |

OTHER PUBLICATIONS

Essler, Fabian HL, et al. "Dynamical correlations after a quantum quench." Physical Review Letters 109.24 (2012): 247206 (Year: 2012).*

(Continued)

*Primary Examiner* — Omar F Fernandez Rivas
*Assistant Examiner* — Michael C. Lee
(74) *Attorney, Agent, or Firm* — DORITY & MANNING, P.A.

(57) ABSTRACT

Quantum computing systems and methods for determining a state of a physical system are provided. In some examples, a method can include obtaining a defined function associated with the physical system, the defined function encoding an estimated value of at least one property to be simulated by a quantum computing system as a gradient of the defined function. The method can include implementing a quantum circuit on a plurality of qubits in a quantum computing system to perform a quantum operation (e.g., the Gilyén quantum gradient algorithm) on the plurality of qubits. The quantum operation is operable to determine the gradient of the defined function. The method can include determining the estimated value for the at least one property based at least on at least one of the plurality of qubits after implementation of the quantum operation.

17 Claims, 4 Drawing Sheets

(56)                    References Cited

OTHER PUBLICATIONS

Schuld, Maria, et al. "Evaluating analytic gradients on quantum hardware." Physical Review A 99.3 (2019): 032331 (Year: 2019).*
Nasr, Milad, et al. "Improving deep learning with differential privacy using gradient encoding and denoising." arXiv preprint arXiv: 2007.11524 (2020) (Year: 2020).*
Flouris, Kyriakos, et al. "Gradient flow encoding with distance optimization adaptive step size." arXiv preprint arXiv:2105.05031 (May 2021). (Year: 2021).*
International Preliminary Report on Patentability for Application No. PCT/US2022/047416, mailed May 2, 2024, 8 pages.
Aaronson, "Shadow Tomography of Quantum States", arXiv:1711. 01053v2 [quant-ph], Nov. 13, 2018, 29 pages.
Aharonov et al., "A Polynomial Quantum Algorithm for Approximating the Jones Polynomial," arXiv:quant-ph/0511096v2, Apr. 10, 2006, 19 pages.
Bauer et al., "Hybrid Quantum-Classical Approach to Correlated Materials", Physical Review X, vol. 6, Issue 3, Sep. 21, 2016, 11 pages.
Bonet-Monroig, "Nearly Optimal Measurement Scheduling for Partial Tomography of Quantum States", arXiv:1908.05628v3 [quant-ph], Sep. 22, 2020, 12 pages.
Brandao et al., "Quantum SDP Solvers: Large Speed-ups, Optimality, and Applications to Quantum Learning", arXiv:1710.02581v3, Apr. 22, 2019, 40 pages.
Brassard et al., "Quantum Amplitude Amplification and Estimation", arXiv:quant-ph/0005055v1, May 15, 2000, 32 pages.
Chen et al., "Robust Shadow Estimation", arXiv:2011.09636v2 [quant-ph], Jun. 25, 2021, 39 pages.
Damascelli, "Probing the Low-Energy Electronic Structure of Complex Systems by ARPES," arXiv:cond-mat/0307085v1, Jul. 3, 2004, 15 pages.
Georges et al., "Hubbard Model in Infinite Dimensions," Physical Review B, vol. 45, No. 12, Mar. 11, 1992, 5 pages.
Gilyen et al., "Optimizing Quantum Optimization Algorithms via Faster Quantum Gradient Computation", arXiv:1711.00465v3 [quant-ph], Apr. 17, 2018, 60 pages.
Gregory et al., "The Water Dipole Moment in Water Clusters," Science, vol. 275, Issue 5301, Feb. 7, 1997, pp. 814-817.
Hadfield et al., "Measurements of Quantum Hamiltonians with Locally-Biased Classical Shadows," arXiv:2006.15788v1 [quant-ph], Jun. 29, 2020, 14 pages.
Huang et al., "Information-Theoretic Bounds on Quantum Advantage in Machine Learning", arXiv:2101.02464v2 [quant-ph], Apr. 2, 2021, 34 pages.
Huang et al., "Predicting Many Properties of a Quantum System from Very Few Measurements", rXiv:2002.08953v2 [quant-ph], Apr. 22, 2020, 40 pages.
Huggins et al., "Nearly Optimal Quantum Algorithm for Estimating Multiple Expectation Values", arXiv:2111.09283v3, Oct. 11, 2022, 18 pages.

Jordan, "Fast Quantum Algorithm for Numerical Gradient Estimation," arXiv:quant-ph/0405146v2, Jan. 2, 2005, 4 pages.
Kitaev, "Quantum Measurements and the Abelian Stabilizer Problem," arXiv:quant-ph/9511026v1, Nov. 20, 1995, 22 pages.
Knill et al., "Optimal Quantum Measurements of Expectation Values of Observables", arXiv:quant-ph/0607019v1, Jul. 3, 2006, 22 pages.
Kotliar et al., "Electronic Structure Calculations With Dynamical Mean-Field Theory: A Spectral Density Functional Approach", arXiv:cond-mat/0511085v1 [cond-mat.str-el], Nov. 3, 2005, 87 pages.
Lee et al., "Even More Efficient Quantum Computations of Chemistry Through Tensor Hypercontraction", arXiv:2011.03494v3, Dec. 16, 2021, 73 pages.
Lin et al., "Near-Optimal Ground State Preparation," arXiv:2002. 12508v3 [quant-ph], Dec. 6, 2020, 22 pages.
Low et al., "Trading T-Gates for Dirty Qubits in State Preparation and Unitary Synthesis," (2018), arXiv:1812.00954v1 [quantph], Dec. 3, 2018, 11 pages.
Meckel et al., "Laser-Induced Electron Tunneling and Diffraction," Science, vol. 320, Jun. 13, 2008, pp. 1478-1482.
Nielsen et al., "Quantum Computation and Quantum Information: 10th Anniversary Edition", Cambridge University Press, New York, 2010, 704 pages.
Pulay et al., "Systematic Ab Initio Gradient Calculation of Molecular Geometries, Force Constants, and Dipole Moment Derivatives", Journal of the American Chemical Society, vol. 101, May 9, 1979, pp. 2550-2560.
Rall, "Quantum Algorithms for Estimating Physical Quantities Using Block-Encodings", arXiv:2004.06832v3 [quant-ph], Jul. 24, 2020, 11 pages.
Somma et al., "Simulating Physical Phenomena by Quantum Networks", arXiv:quant-ph/0108146v1, Aug. 31, 2001, 44 pages.
Verteletskyi et al., "Measurement Optimization in the Variational Quantum Eigensolver Using a Minimum Clique Cover", arXiv:1907. 03358v4 [quant-ph], Mar. 26, 2020, 7 pages.
Von Apeldoorn et al., "Improvements in Quantum SDP-Solving with Applications", arXiv:1804.05058v1 [quant-ph], Apr. 13, 2016, 36 pages.
Von Apeldoorn, "Quantum Probability Oracles & Multidimensional Amplitude Estimation," 16th Conference on the Theory of Quantum Computation, Communication and Cryptography, Jul. 5-8, 2021, Online, 11 pages.
Von Burg et al., "Quantum Computing Enhanced Computational Catalysis," arXiv:2007.14460v2, Mar. 3, 2021, 101 pages.
Wan et al., "Fast Digital Methods for Adiabatic State Preparation," ArXiv:2004.04164v1 [quant-ph], Apr. 8, 2020, 50 pages.
Zhao et al., Fermionic Partial Tomography via Classical Shadows arXiv:2010.16094 [quant-ph], Oct. 3, 2022, 31 pages.
International Search Report and Written Opinion for Application No. PCT/US2022/047416, mailed Dec. 12, 2023, 12 pages.
Davidson, "Reduced Density Matrices in Quantum Chemistry", Academic Press, New York, 1976, 145 pages.
Wikipedia, "Green's Function", https://en.wikipedia.org/wiki/Green% 27s_function, retrieved on Nov. 11, 2025, 14 pages.

* cited by examiner

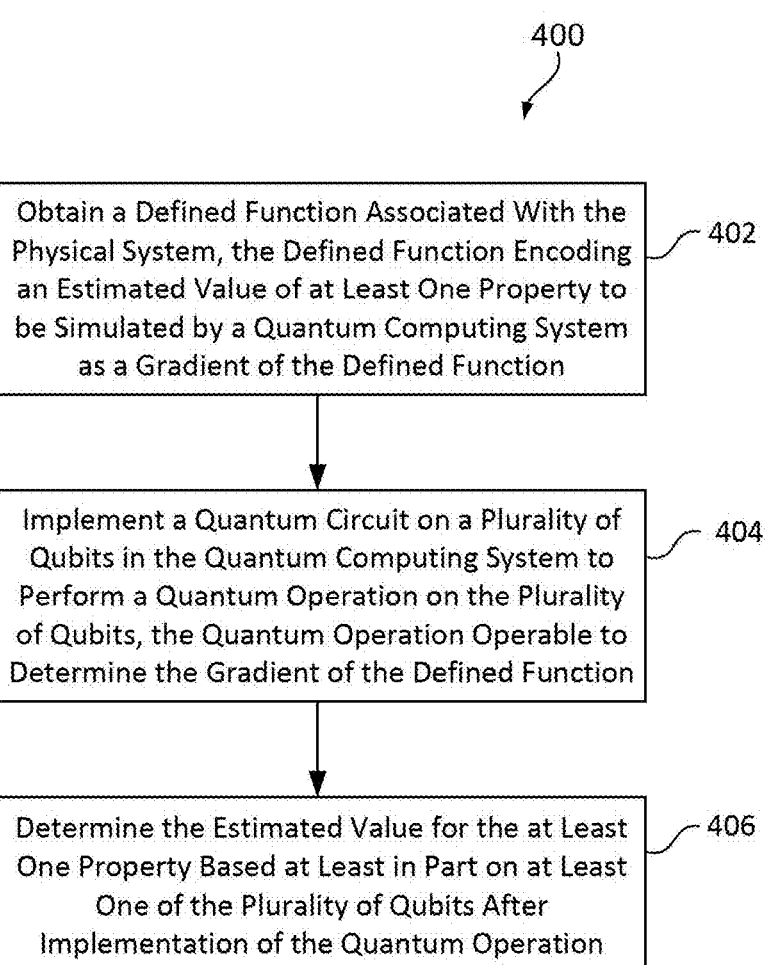

400

Obtain a Defined Function Associated With the Physical System, the Defined Function Encoding an Estimated Value of at Least One Property to be Simulated by a Quantum Computing System as a Gradient of the Defined Function — 402

Implement a Quantum Circuit on a Plurality of Qubits in the Quantum Computing System to Perform a Quantum Operation on the Plurality of Qubits, the Quantum Operation Operable to Determine the Gradient of the Defined Function — 404

Determine the Estimated Value for the at Least One Property Based at Least in Part on at Least One of the Plurality of Qubits After Implementation of the Quantum Operation — 406

FIG. 4

PERFORMING PROPERTY ESTIMATION USING QUANTUM GRADIENT OPERATION ON QUANTUM COMPUTING SYSTEM

PRIORITY CLAIM

The present application claims the benefit of priority of U.S. Provisional Application Ser. No. 63/270,877, titled "Performing Property Estimation Using Quantum Gradient Operation on Quantum Computing System," filed on Oct. 22, 2021, which is incorporated herein by reference.

FIELD

The present disclosure relates generally to quantum computing systems, and more particularly to quantum computing systems and methods operable to perform simulations of physical systems (e.g., quantum systems).

BACKGROUND

Quantum computing is a computing method that takes advantage of quantum effects, such as superposition of basis states and entanglement to perform certain computations more efficiently than a classical digital computer. In contrast to a digital computer, which stores and manipulates information in the form of bits, e.g., a "1" or "0," quantum computing systems can manipulate information using quantum bits ("qubits"). A qubit can refer to a quantum device that enables the superposition of multiple states, e.g., data in both the "0" and "1" state, and/or to the superposition of data, itself, in the multiple states. In accordance with conventional terminology, the superposition of a "0" and "1" state in a quantum system may be represented, e.g., as a $|0\rangle + b|1\rangle$ The "0" and "1" states of a digital computer are analogous to the $|0\rangle$ and $|1\rangle$ basis states, respectively of a qubit.

SUMMARY

Aspects and advantages of embodiments of the present disclosure will be set forth in part in the following description, or can be learned from the description, or can be learned through practice of the embodiments.

One example aspect of the present disclosure is directed to a method for determining a state of a physical system. The method can include obtaining, by one or more computing devices, a defined function associated with the physical system, the defined function encoding an estimated value of at least one property to be simulated by a quantum computing system as a gradient of the defined function. The method can include implementing, by the one or more computing devices, a quantum circuit on a plurality of qubits in a quantum computing system to perform a quantum operation on the plurality of qubits. The quantum operation is operable to determine the gradient of the defined function. The method can include determining, by the one or more computing devices, the estimated value for the at least one property based at least in part on at least one of the plurality of qubits after implementation of the quantum operation.

Other aspects of the present disclosure are directed to various systems, methods, apparatuses, non-transitory computer-readable media, computer-readable instructions, and computing devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, explain the related principles.

BRIEF DESCRIPTION OF THE DRAWINGS

Detailed discussion of embodiments directed to one of ordinary skill in the art is set forth in the specification, which refers to the appended figures, in which:

FIG. 4 depicts a method according to example embodiments of the preset disclosure.

DETAILED DESCRIPTION

Figure 1:
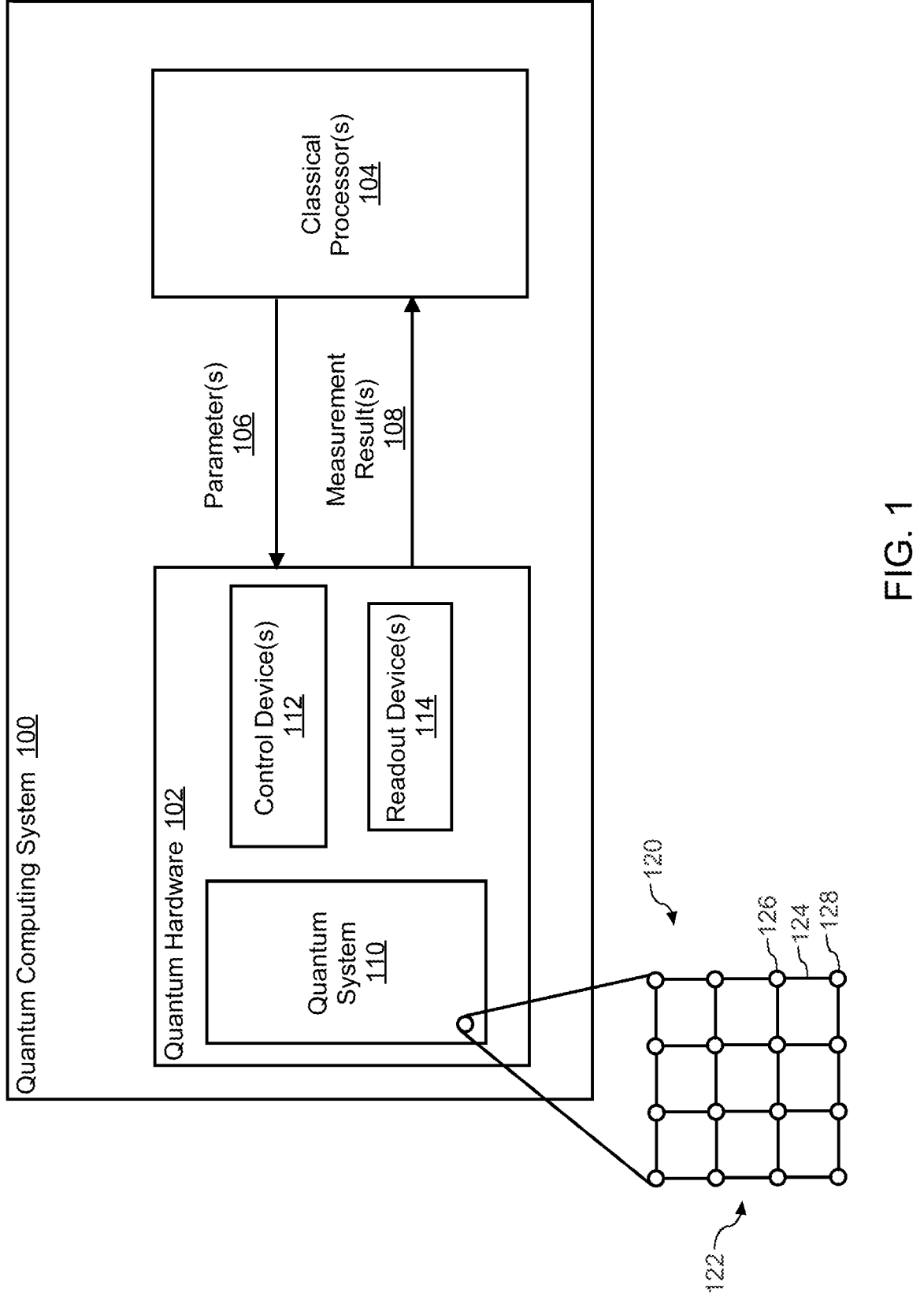
FIG. 1 depicts an example quantum computing system according to example embodiments of the present disclosure.

Example aspects of the present disclosure are directed to quantum computing systems and methods that can be used, for instance, to simulate experiments in a physical system (e.g., a quantum system). The quantum computing systems and methods can be used, for instance, to determine estimated properties associated with the system, such as expectation values of observables with respect to a state of a quantum system or elements associated with unequal time correlation functions. As one example, a quantum computing system can be used to determine properties in an electronic ground state problem, such as measuring dipole moment and polarizability, electron density, forces experienced by classical nuclei, or other properties associated with a ground state. As another example, elements associated with correlation functions can be determined, for instance, to understand aspects of quantum many-body phenomena in condensed matter physics and beyond.

A complexity associated with performing a simulation of a physical system using quantum computing systems can be attributable to the state preparation of qubits in the quantum computing systems to simulate a state of the physical system. State preparation of qubits can be computationally and operationally expensive and can require, for instance, performing phase estimation and/or other state preparation operations on the qubits with high precision.

One approach to determining expectation values for a plurality of observables using a quantum computing system can include a sampling approach that involves repeatedly preparing the state of qubits while also performing measurements to determine estimated values after every state preparation. The sampling approach, however, requires performing a number of state preparation steps that scales exponentially relative to a defined error tolerance. Amplitude estimation techniques can provide better scaling with error tolerance. However, amplitude estimation techniques can be suitable for measuring only one estimated value for a single observable at a time. As a result, using amplitude estimation to determine expectation values for a plurality of observables (e.g., M observables) can require scaling by a factor directly associated with the number of observables.

According to example aspects of the present disclosure, estimated values for multiple properties of a physical system can be determined by encoding a defined function whose gradient yields the estimated values of the multiple properties in a parameterized quantum circuit implemented in a quantum computing system. A quantum operation can then be performed through implementation of the quantum circuit to determine the gradient. The estimated values can then be determined by measurements of one or more qubits in the quantum computing system after implementation of the quantum operation.

For example, the quantum computing system can be used to determine expectation values of observables for a physical system as the properties of interest, such as the expectation value of a Pauli Z operator on every qubit (e.g., which can yield electron density in a ground state problem application) or a fermionic k-reduced density matrix. According to example aspects of the present disclosure, a defined function can be encoded whose gradient yields expectation values of multiple observables in the quantum system. A quantum operation can be performed through implementation of a quantum circuit on a plurality of qubits in a quantum computing system to determine the gradient. The expectation values can then be determined from the plurality of qubits after implementation of the quantum operation.

More particularly, in some embodiments, the quantum operation can implement a quantum algorithm for determining the gradient of the defined function. In some embodiments, the quantum algorithm can be the Gilyén et al. gradient algorithm described, for instance, in Gilyén et al. "Optimizing quantum optimization algorithms via faster quantum gradient computation," In Proceedings of the 30th ACM-SIAM Symposium on Discrete Algorithms (SODA 2019), pp. 1425-1444, which is incorporated by reference herein. The Gilyén quantum gradient algorithm builds on a quantum gradient algorithm disclosed in S. P. Jordan, Phys. Rev. Lett. 95, 050501 (2005), which is incorporated by reference herein, that demonstrates an exponential quantum speedup for calculating the gradient of a function in a particular black box access model. The Jordan quantum gradient algorithm can query a black box oracle that yields the objective function in a quantum phase, and use phase kickback as well as the quantum Fourier transform to achieve a 1st-order approximation of the gradient of this objective function using a number of queries that are independent of the dimension of the gradient vector. The Gilyén quantum gradient algorithm applies a modified version of the Jordan quantum gradient algorithm to the case where the value of the function is encoded in the expectation value of a quantum observable while also including optimizations that arise from higher-order derivative formulae.

The quantum operation (e.g., the quantum gradient algorithm) can be performed by implementing a quantum circuit, including a plurality of quantum gates, on a plurality of qubits in the quantum computing system. In some embodiments, the plurality of qubits can include M registers of first qubits, a system register of N second qubits, and an ancilla qubit where M is the number of observables to be determined and N is an integer (e.g., an integer power of two). The N second qubits can be initialized to zero and can be subjected to state preparation operations to prepare the state of the qubits, for instance, to simulate the physical system. The M registers of first qubits can provide expectation values for each of the quantum observables. Each of the M registers can include b first qubits where b is a number of digits used in a binary representation of the observable associated with the respective qubit register.

The quantum circuit can implement a state preparation unitary on the N second qubits as state preparation operations to prepare the state of qubits in the quantum computing system to simulate the state of the physical system. The quantum circuit can implement a probability oracle for the defined function whose gradient encodes expectation values of the observables. The quantum circuit can encode expectation values for each of M observables in the M registers of first qubits. The quantum circuit can implement a Hadamard test (e.g., using one or more Hadamard gates and/or phase gates) on the ancilla qubit to encode the gradient of the defined function in the amplitudes of the ancilla qubit. Doubly-controlled gates can implement time evolution by the observables on the first qubit registers. The doubly-controlled gates can be controlled based on the register of N qubits and the ancilla qubit.

The present inventors have discovered that encoding the expectation values for the multiple observables as a gradient for a defined function and solving for the gradient using a quantum operation according to example aspects of the present disclosure can lead to more efficient use of quantum computing resources to determine expectation values for observables. More particularly, the quantum operation according to example aspects of the present disclosure can include implementing a plurality of state preparation operations. The number of state preparation operations required to determine expectation values for the observables to within a defined error tolerance can scale as a function of the square root of the number of observables to be determined using the quantum computing device. This provides improved scalability and more efficient use of quantum computing resources relative to, for instance, a sampling approach or an amplitude estimation approach.

Aspects of the present disclosure are discussed with reference to determining expectation values for observables in a physical system using quantum computing systems for purposes of illustration and discussion. Those of ordinary skill in the art, using the disclosures provided herein, will understand that aspects of the present disclosure can be used for other applications. For instance, aspects of the present disclosure can be used, for instance, for evaluation of unequal time correlation functions.

More particularly, in some embodiments, a defined function can be constructed whose gradient yields elements of interest (e.g., matrix elements of interest) to evaluate the unequal correlation functions. A quantum operation (e.g., Gilyén quantum gradient algorithm) can then be performed through implementation of the quantum circuit to determine the gradient. The estimated values can then be determined by measurements of one or more qubits in the quantum computing system after implementation of the quantum operation.

Aspects of the present disclosure provide a number of technical effects and benefits. For instance, the quantum computing systems and methods according to example aspects of the present disclosure can be used to determine estimated values for observables or other items of interest to within a defined error tolerance using less quantum computational resources (e.g., less state preparation operations on a plurality of qubits) relative to other approaches, such as sampling approaches or amplitude estimation approaches. As a result, quantum computing resources can be used for performing other functions of the quantum computing system, such as error correction, performing other quantum algorithms, etc. Moreover, because less quantum computing operations (e.g., less state preparation operations) are required to determine the expectation values of the observables, there is less opportunity for error to disrupt the quantum computations, leading to improved coherence of the quantum computing operation.

Example aspects of the present disclosure are directed to accurately and efficiently estimating multiple properties from a quantum computation. In some examples, expectation values of a collection of M Hermitian operators $\{O_j\}$ with respect to a pure state $\psi$ are evaluated. Each expectation value may be evaluated to within additive error $\varepsilon$ using as few calls as possible to a state preparation oracle for $\psi$ (or its inverse). One approach is to repeatedly prepare $\psi$ and projectively measure mutually commuting subsets of $\{O_j\}$. Alternatively, strategies based on amplitude estimation achieve a quadratic speedup with respect to $\varepsilon$ but entail measuring each observable separately.

A range of "shadow tomography" techniques use joint measurements of multiple copies of $\psi$ to achieve polylogarithmic scaling with respect to M at the expense of an unfavorable $1/\varepsilon^4$ scaling. In certain situations, randomized methods based on the idea of "classical shadows" of the state obtain $1/\varepsilon^2$ scaling while improving upon sampling protocols with deterministic measurement settings.

The present inventors have discovered that the example systems and methods for estimating multiple properties disclosed herein may achieve the same $1/\varepsilon$ scaling as methods based on amplitude estimation, but may also improve the scaling with respect to M from $\tilde{O}(M)$ to $\tilde{O}(\sqrt{M})$, where the tilde in $\tilde{O}(\cdot)$ hides logarithmic factors. According to example embodiments, a function $f$ is constructed whose gradient yields the expectation values of interest and $f$ is encoded in a parameterized quantum circuit. The Gilyén quantum algorithm is applied for gradient estimation to obtain the desired scaling. The following is an example theorem:

Theorem 1: Let $\{O_j\}$ be a set of M Hermitian operators on N qubits, with spectral norms $\|O_j\|\leq 1$ for all j. There exists a quantum algorithm that, for any N-qubit quantum state $\psi$ prepared by a unitary $U_\psi$, outputs estimates $\tilde{o}_j$ such that $|\tilde{o}_j - \langle\psi|O_j|\Omega\rangle|\leq\varepsilon$ for all j with probability at least $\frac{2}{3}$, using $\tilde{O}(\sqrt{M}/\varepsilon)$ queries to $U_\psi$ and $$U_\psi^\dagger,$$

along with $\tilde{O}(\sqrt{M}/\varepsilon)$ gates of the form controlled-$e^{-ixO_j}$ for each j, for various values of x with $|x|\in O(1/\sqrt{M})$.

As shown in Corollary 3 below, this query complexity is worst-case optimal (up to logarithmic factors in the high precision regime where $$\varepsilon\in\left(0,\frac{1}{3\sqrt{M}}\right)\right).$$

A lower bound for the above-referenced subject matter may be obtained as a corollary. More particularly, J. van Apeldoorn, "Quantum probability oracles & multi-dimensional amplitude estimation", $16^{th}$ Conference on the Theory of Quantum 2021 ("Apeldoorn") established a lower bound where results are expressed in terms of a particular quantum access model for classical probability distributions:

Definition 1 (Sample oracle for a probability distribution): Let p be a probability distribution over M outcomes, i.e., $p\in[0,1]^M$ with $\|p\|_1=1$. A sample oracle $U_p$ for p is a unitary operator that acts as $$U_p:\ 00\mapsto\sum_{j=1}^{M}\sqrt{p_j}\,|j\rangle\otimes|\phi_j\rangle, \tag{1}$$

where the $|\phi_j\rangle$ are arbitrary normalized quantum states. Here and throughout this disclosure, queries to a unitary oracle U and to its inverse $U^\dagger$ are counted as equivalent in cost. Based on this, Theorem 2 may be established:

Theorem 2: Let M be a positive integer power of 2 and let $$\varepsilon\in\left(0,\frac{1}{3\sqrt{M}}\right).$$

There exists a known matrix $A\in\{-1,+1\}^{M\times M}$ such that the following is true. Suppose $\mathcal{A}$ is an algorithm that, for every probability distribution p, accessed via a sample oracle $U_p$, outputs (with probability at least $\frac{2}{3}$) a $\tilde{q}$ such that $\|Ap-\tilde{q}\|_\infty\leq\varepsilon$. Then $\mathcal{A}$ must use $\Omega(\sqrt{M}/\varepsilon)$ queries to $U_p$ in the worst case. This theorem may be used to derive the following corollary, establishing the near-optimality of the algorithm in certain regimes.

Corollary 3: Let M be a positive integer power of 2 and let $$\varepsilon\in\left(0,\frac{1}{3\sqrt{M}}\right).$$

Let $\mathcal{A}$ be any algorithm that takes as an input an arbitrary set of M observables $\{O_j\}$. Suppose that, for every quantum state $|\psi\rangle$, accessed via a state preparation oracle $U_\psi$, $\mathcal{A}$ outputs estimates of each $\langle\psi|O_j|\psi\rangle$ to within additive error $\varepsilon$ (with probability at least $\frac{2}{3}$). Then, there exists a set of observables $\{O_j\}$ such that $\mathcal{A}$ applied to $\{O_j\}$ must use $\Omega(\sqrt{M}/\varepsilon)$ queries to $U_\psi$. The following provides an example mathematical demonstration.

Assume for the sake of contradiction that for any $\{O_j\}$ and $U_\psi$, the algorithm $\mathcal{A}$ uses $o(\sqrt{M}/\varepsilon)$ queries to $U_\psi$ to estimate every $\langle\psi|O_j|\psi\rangle$ to within error $\varepsilon$ (with success probability at least $\frac{2}{3}$). For any sample oracle $U_p$ in the form of equation (1), consider the state:

$$\psi(U_p)\sum_{j=1}^{M}\sqrt{p_j}\left(\bigotimes_{i=1}^{M}\left|\frac{1-A_{ij}}{2}\right\rangle\right)\otimes|j\rangle\otimes|\phi_j\rangle. \tag{2}$$

A quick computation verifies that the i-th entry of the vector Ap is equal to $\langle\psi(U_p)|Z_i|\psi(U_p)\rangle$, where $Z_i$ denotes the Pauli Z operator acting on the i-th qubit. Since the matrix A is known, it is clear that $\psi(U_p)=U_A(I\otimes U_p)|0\rangle$ for a known unitary $U_A$:

$$U_A=\sum_j\left(\bigotimes_{i=1}^{M}X_i^{\frac{\delta_{A_{ij}},-1}{}}\right)\otimes|j\rangle\langle j|\otimes\mathbb{I}. \tag{3}$$

Therefore, an algorithm $\mathcal{A}$ may be applied with $O_j=Z_j$ for $j\in\{1,\ldots,M\}$ and $U_\psi=U_A(\mathbb{I}\otimes U_p)$. This may indicate that an algorithm that for every $U_p$, estimates each entry of Ap to within error $\varepsilon$ using $o(\sqrt{M}/\varepsilon)$ queries to $U_p$, contradicting Theorem 2 and completing the proof.

A framework for simultaneously estimating multiple expectation values uses the improved Gilyén quantum algorithm for gradient estimation. The Gilyén algorithm builds on the Jordan algorithm, which demonstrated an exponential quantum speedup for computing the gradient in a particular black-box access model. Specifically, the Jordan algorithm uses one query to a binary oracle for a function $f$, along with phase kickback and the quantum Fourier transform, to obtain an approximation of the gradient $\nabla f$.

The definition of a probability oracle for the Gilyén algorithm is provided below. Definition 2 (Example Probability Oracle): Consider a function $f\colon \mathbb{R}^M \to [0,1]$. A probability oracle $U_f$ for f is a unitary operator that acts as $$U_f\colon |x\rangle|0\rangle \mapsto |x\rangle\big(\sqrt{f(x)}\,|1\rangle|\phi_1(x)\rangle + \sqrt{1-f(x)}\,|0\rangle|\phi_0(x)\rangle\big), \tag{4}$$

where $|x\rangle$ denotes a discretization of the variable x encoded into a register of qubits, $|0\rangle$ denotes the all-zeros state of a register of ancilla qubits, and $|\phi_0(x)\rangle$ and $|\phi_1(x)\rangle$ are arbitrary quantum states.

The Gilyén algorithm uses such a probability oracle to encode a finite-difference approximation to a directional derivative of $f$ in the phase of an ancilla register, e.g., a first-order approximation is implemented by:

$$A_{f'_1}\colon |x\rangle|0\rangle \mapsto e^{i(f(x)-f(-x))}|x\rangle|0\rangle \tag{5}$$

As in the Jordan algorithm, a quantum Fourier transform can then be used to extract an approximate gradient from the phases accumulated on an appropriate superposition of basis states. By using higher-order finite-difference formulas, the Gilyén algorithm may estimate the gradient with a scaling that is optimal (up to logarithmic factors) for a particular family of smooth functions. Example properties of the Gilyén algorithm are provided in the theorem below:

Theorem 4: Let $\varepsilon$, $c \in \mathbb{R}_+$ be fixed constants, with $\varepsilon \leq c$. Let $M \in \mathbb{Z}_+$ and $x \in \mathbb{R}^M$. Suppose that $f\colon \mathbb{R}^M \to \mathbb{R}$ is an analytic function such that for every $k \in \mathbb{Z}_+$, the following bound holds for all k-th order partial derivatives of f at x (denoted by $$\partial_\alpha f(x))\colon |\partial_\alpha f(x)| \leq c^k k^{\frac{k}{2}}.$$

Then, there is a quantum algorithm that outputs an estimate $\tilde{g} \in \mathbb{R}^M$ such that $\|\nabla f(x) - \tilde{g}\|_\infty \leq \varepsilon$, with probability at least $1-\delta$. This algorithm makes $\tilde{\partial}(c\sqrt{M}\,\log(M/\delta)/\varepsilon)$ queries to a probability oracle for f.

Example aspects of the present disclosure may be used to determine expectation values using the quantum gradient algorithm (e.g., the Gilyén algorithm). For instance, a probability oracle may be constructed for a function whose gradient encodes the expectation values of interest and the quantum gradient algorithm for the gradient may be applied. An example demonstration of Theorem 1 is provided below:

The parameterized unitary may be defined as:

$$U(x)\prod_{j=1}^M e^{-2ix_j O_j} \tag{65}$$

for $x \in \mathbb{R}^M$. The derivative of this unitary with respect to $x_\ell$ is $$\frac{\partial U}{\partial x_\ell} = -2i\Big(\prod_{j=1}^{\ell} e^{-2ix_j O_j}\Big) O_\ell\Big(\prod_{k=\ell+1}^M e^{-2ix_k O_k}\Big) \tag{7}$$

To determine the expectation value of the $O_j$ with respect to the state $\psi$, the following function $f$ may be defined:

$$f(x) - \frac{1}{2}\mathrm{Im}[\langle\psi|U(x)|\psi\rangle] + \frac{1}{2}. \tag{8}$$

Using Equation (7) above leads to:

$$\frac{\partial f}{\partial x_\ell}\Big|_{x=0} = \langle\psi|O_\ell|\psi\rangle. \tag{9}$$

Therefore, the gradient $\nabla f(0)$ is precisely the collection of expectation values of interest.

$f$ may satisfy the conditions of Theorem 4. Observe that $f$ is analytic and that the k-th order partial derivative of $f$ with respect to any collection of indices $\alpha \in \{1, \dots, M\}^k$ takes the form:

$$\partial_\alpha f(x) = (-2)^{k-1}\big(i^k\langle\psi|V(x,\alpha)|\psi\rangle\big), \tag{10}$$

for some operator $V(x, \alpha)$ which depends on both $\alpha$ and x. Note that V is a product of terms which are either unitary, or from $\{O_j\}$. Since $\|O_j\| \leq 1$ for all j, we have $\|V\| \leq 1$, and therefore $|\partial_\alpha f(0)| \leq 2^{k-1}$ for all k and $\alpha$. By setting c=2, we satisfy the derivative conditions of Theorem 4.

To construct a probability oracle for $f$ in some cases, a quantum circuit may encode $f(x)$ into the amplitudes of an ancilla. The quantum circuit may be constructed using the Hadamard test for the imaginary component of $\langle\psi|U(x)|\psi\rangle$. Let $$F(x)(H \otimes \mathbb{1})(c - U(x))\big(S^\dagger H \otimes U_\psi\big), \tag{11}$$

where H denotes the Hadamard gate, c−U(x) the U(x) gate controlled on the first qubit, and $S := |0\rangle\langle 0| + i|1\rangle\langle 1|$ the phase gate. Applied to $|0\rangle \otimes |0\rangle$, the circuit may encodes $f(x)$ in the amplitudes with respect to the computational basis states of the first qubit:

$$F(x)|0\rangle \otimes |0\rangle = \sqrt{f(x)}\,|1\rangle \otimes |\phi_1(x)\rangle + \sqrt{1-f(x)}\,|0\rangle \otimes |\phi_0(x)\rangle \tag{12}$$

for some normalized states $|\phi_0(x)\rangle$ and $|\phi_1(x)\rangle$. Note that F(x) may be a single call to the oracle $U_\psi$.

Figure 3:
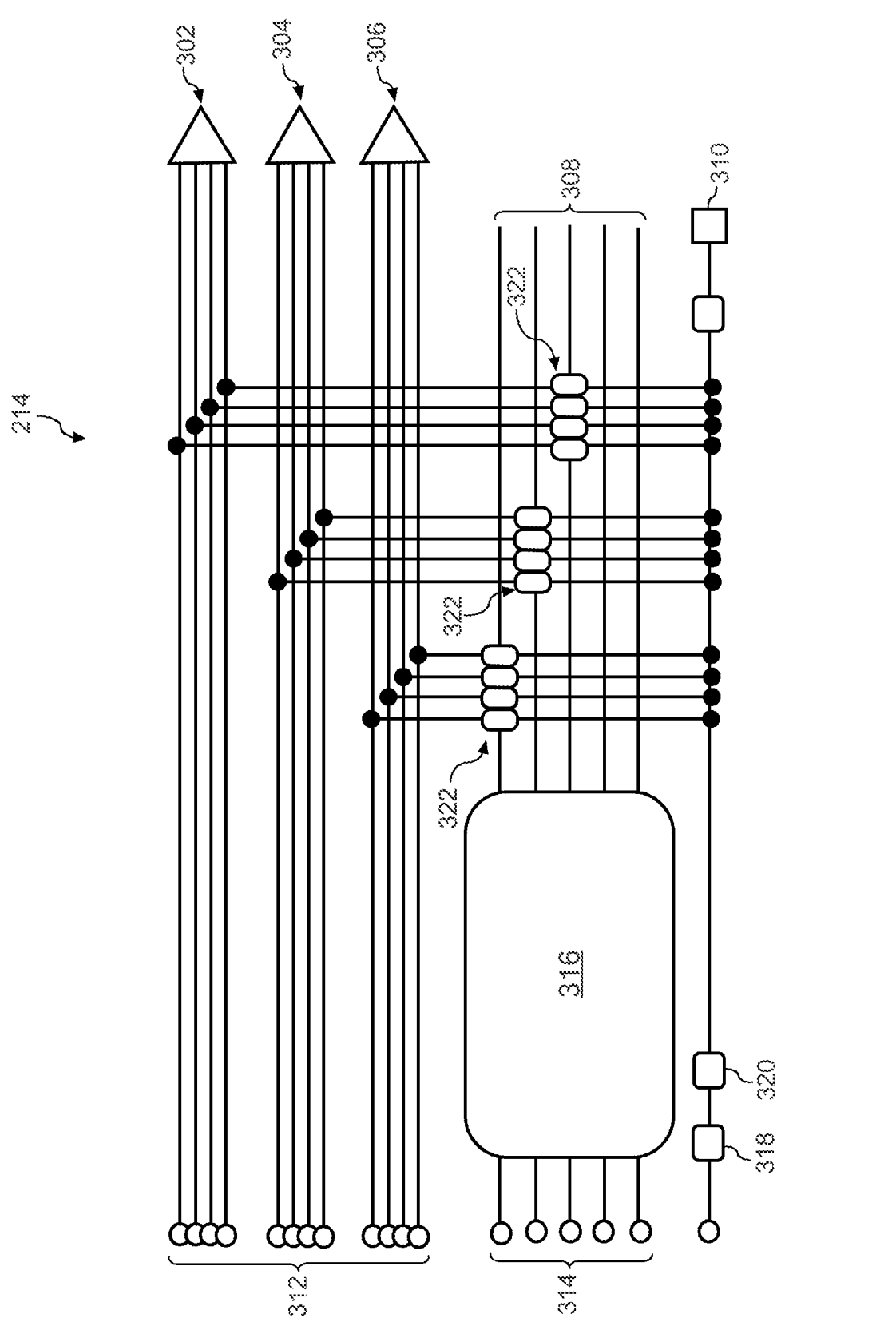
FIG. 3 depicts an example quantum circuit implemented by a quantum computing system according to example embodiments of the present disclosure.

Quantum controls may be added to the rotations in F(x), so that F(x) is controlled on a register encoding x. For instance, consider the unitary $$U_f := \Sigma_{k \in G_n^M} |k\rangle\langle k| \otimes F(kx_{max}),$$

where $$G_n^M$$

is a set of $2^{nM}$ points distributed in an M-dimensional unit hypercube, with $n = \mathcal{O}(\log(1/\varepsilon))$, and $x_{max}$ is a rescaling factor. The values of $x_{max}$ and n may be chosen to satisfy the requirements of the gradient algorithm. Here, $|k\rangle = |k_1\rangle \ldots |k_M\rangle$ for $$k \in G_n^M$$

denotes the basis state storing the binary representation of k in M n-qubit index registers. The controlled time evolution operator for each $O_j$ can be implemented as a product of n controlled-$e^{-ixO_j}$ gates with exponentially spaced values of x, each controlled on the appropriate qubit of the jth index register, as shown in FIG. 3.

$U_f$ is a probability oracle for the function $f$, and each call to $U_f$ involves a single call to the state preparation oracle $U_\psi$. Theorem 4 implies that with probability at least ⅔, every component of the gradient of $f$, and hence all of the expectation values $\langle \psi|O_j|\psi\rangle$, may be estimated to within an error $\varepsilon$ using $\tilde{\mathcal{O}}(\sqrt{M}/\varepsilon)$ queries to $U_f$. The complexity in terms of the controlled time evolutions follows from multiplying the number of controlled time evolutions required for each query to $U_f$, i.e., $\mathcal{O}(\log(M/\varepsilon))$, by the total number of queries, i.e., $\tilde{\mathcal{O}}(\sqrt{M}/\varepsilon)$. $x_{max} \in \mathcal{O}(1/\sqrt{M})$ as a consequence of the details of the proof of Theorem 4. This completes the example demonstration of Theorem 1. Furthermore, the space complexity of the gradient algorithm may be the same as that of the probability oracle up to an additive logarithmic factor Therefore, the systems and methods according to example aspects of the present disclosure may use $\mathcal{O}(M \log(1/\varepsilon)+N)$ qubits.

Aspects of the present disclosure are directed to simultaneously estimating the expectation values of multiple observables with respect to a pure state $\psi$. An algorithm may use $\tilde{\mathcal{O}}(\sqrt{M}\varepsilon^{-1})$ applications of $U_\psi$ and its inverse, where M denotes the number of observables and $\varepsilon$ the target error, and $U_\psi$ is a unitary that prepares $\psi$. A lower bound on a closely related problem posed in Apeldoorn implies that, for algorithms given black-box access to $U_\psi$, this query complexity is worst-case optimal up to logarithmic factors when $$\varepsilon \in \left(0, \frac{1}{3\sqrt{M}}\right).$$

In fact, aspects of the present disclosure affirmatively resolves an open question from Apeldoorn regarding the achievability of this bound for the simultaneous estimation of classical random variables. The results imply that the optimal cost for expectation value estimation may become exponentially worse with respect to M when one demands a scaling that goes as $\varepsilon^{-1}$ instead of $\varepsilon^{-2}$. Furthermore, the instances used in establishing our lower bounds may involve a set of mutually commuting observables, implying that commutativity may not be helpful when implementing $\varepsilon^{-1}$ scaling.

A comparison with other approaches for the estimation of expectation values is provided in Table I below:

| | Comm. | Non-comm. | k-RDM |
|---|---|---|---|
| Sampling | $\mathcal{O}\left(\frac{\log M}{\varepsilon^2}\right)$ | $\tilde{\mathcal{O}}\left(\frac{M}{\varepsilon^2}\right)$ | $\tilde{\mathcal{O}}\left(\frac{N^k}{\varepsilon^2}\right)$ [25] |
| Amp. Est. | $\tilde{\mathcal{O}}\left(\frac{M}{\varepsilon}\right)$ | $\tilde{\mathcal{O}}\left(\frac{M}{\varepsilon}\right)$ | $\tilde{\mathcal{O}}\left(\frac{N^{2k}}{\varepsilon}\right)$ |
| Shadow Tom. | $\mathcal{O}\left(\frac{\log M}{\varepsilon^4}\right)$ | $\mathcal{O}\left(\frac{\log M}{\varepsilon^4}\right)$ | $\mathcal{O}\left(\frac{k \log N}{\varepsilon^4}\right)$ |
| Gradient | $\tilde{\mathcal{O}}\left(\frac{\sqrt{M}}{\varepsilon}\right)$ | $\tilde{\mathcal{O}}\left(\frac{\sqrt{M}}{\varepsilon}\right)$ | $\tilde{\mathcal{O}}\left(\frac{N^k}{\varepsilon}\right)$ |

Table I provides a comparison of the (worst-case) complexities, in terms of state preparation oracle queries, of different approaches for measuring multiple observables. Three applications are provided: estimating the expectation values of M commuting or non-commuting observables, and determining the fermionic k-RDM of an N-mode system. Here, $\varepsilon$ denotes the additive error to which each quantity is estimated. Strategies based on naive sampling, amplitude estimation, and shadow tomography are compared to the gradient-based approach according to examples of the present disclosure.

Aspects of the present disclosure are capable of estimating each element of the k-body fermionic reduced density matrix (k-RDM) of an N-mode system to within error $\varepsilon$ using $\tilde{\mathcal{O}}(N^k/\varepsilon)$ state preparation queries. This offers an unconditional asymptotic speedup compared to existing methods when $\varepsilon = o(N^{-k/3})$. This may be particularly useful in practical applications where we wish to achieve a fixed error in extensive quantities by measuring the 1 or 2-RDM and summing $\Omega(N)$ elements.

The gradient-based approach to estimating expectation values according to examples of the present disclosure may be extended to other properties. For example, consider the task of evaluating a collection of two-point dynamic correlation functions. These functions take the form $$C_{A,B}(t) := \langle \psi|U(0,t)A^\dagger U(t,0)B|\psi\rangle, \tag{14}$$

where A and B are some simple operators and U(t, t') is the time evolution operator that maps the system from time t' to time t. These correlation functions are often directly accessible in experiment, as in the case of angle-resolved photoemission spectroscopy, and may also be central to hybrid quantum-classical methods based on dynamical mean-field theory.

Examples of the present disclosure may include time evolution by each of the M observables. The total duration of time evolution required scales as $\tilde{\mathcal{O}}(M/\varepsilon)$. An additional $\tilde{\mathcal{O}}(M \log(1/\varepsilon))$ qubits may be used, although the approach may be modified to trade off between space and query complexities. When simultaneously estimating O(N) expectation values, the asymptotic scaling of the space complexity may only be logarithmically larger than that of storing the system itself. This may be the case in a variety of contexts, for example, in the evaluation of the momentum distribution. In other situations, the space overhead may be more substantial, though the capability of modern simulation algorithms to use so-called "dirty ancilla" (temporarily borrowing qubits in an arbitrary state) may offset this challenge in some contexts.

In some instances, the observables of interest may have different norms, or the desired precision varies. In these instances, aspects of the present disclosure may include measuring certain observables using aspects of the present disclosure and measuring others using a sampling-based method. In some examples, the Gilyén gradient estimation algorithm may be generalized to accommodate functions whose gradient components are not necessarily uniformly bounded. This may allow for simultaneous estimation of the expectation values of observables $\{O_j\}$ with arbitrary norms $\|O_j\|$ (possibly greater than 1) using $\tilde{o}\ (\sqrt{\Sigma_j\|O_j\|^2}/\varepsilon)$ queries.

Extracting useful information from a quantum computation, especially a quantum simulation, is a bottleneck for many applications. This is especially true in fields such as quantum chemistry and materials science, where it may be desirable to couple high-level quantum calculations with coarser approximations at other length scales to describe macroscopic physical phenomena. The gradient-based approach to the estimation of expectation values according to examples of the present disclosure may be a useful tool and a starting point for related approaches to other problems.

One example embodiment of the present disclosure is directed to a method for determining a state of a physical system. The method can include obtaining, by one or more computing devices, a defined function associated with the physical system, the defined function encoding an estimated value of at least one property to be simulated by a quantum computing system as a gradient of the defined function. The method can include implementing, by the one or more computing devices, a quantum circuit on a plurality of qubits in the quantum computing system to perform a quantum operation on the plurality of qubits, the quantum operation operable to determine the gradient of the defined function. The method can include determining, by the one or more computing devices, the estimated value for the at least one property based at least in part on at least one of the plurality of qubits after implementation of the quantum operation.

In some embodiments, the property to be simulated comprises an expectation value of a quantum observable of the physical system. In some embodiments, the property to be simulated comprises one or more elements associated with unequal time correlation functions.

In some embodiments, the quantum operation is operable to determine the gradient of the defined function using the Gilyén quantum gradient algorithm.

In some embodiments, implementing, by the one or more computing devices, a quantum circuit comprises: implementing, by the one or more computing devices, a plurality of state preparation operations on at least a subset of the plurality of qubits using the quantum circuit.

In some embodiments, the quantum circuit implements a probability oracle for the defined function.

In some embodiments, the quantum circuit is implemented on M first qubit registers, a system register of N second qubits, and at least one ancilla qubit, where M is the number of quantum observables and N is an integer. The quantum circuit can encode the defined function into amplitudes of the ancilla qubit. The quantum circuit can implement a Hadamard test on the ancilla qubit using one or more Hadamard gates and one or more phase gates. The N second qubits can be initialized to zero. The quantum circuit can be operable to implement a state preparation unitary on the N second qubits.

In some embodiments, the quantum circuit can implement a controlled time evolution for the quantum observable using at least one doubly controlled quantum gate on the M first qubit registers. The doubly controlled gate can be based at least in part on one of the N second qubits and the ancilla qubit.

In some embodiments, determining, by the one or more computing devices, the estimated value for the property comprises performing a measurement on at least one of the plurality of qubits.

Another example embodiment of the present disclosure is directed to a quantum computing system. The quantum computing system includes a plurality of qubits, the plurality of qubits comprising M registers of first qubits, a register of N second qubits, and at least one ancilla qubit. The quantum computing system includes one or more control devices configured to implement a quantum circuit on the plurality of qubits to determine a gradient of a defined function using a quantum operation, wherein the gradient of the defined function encodes estimated values of a property to be simulated by the quantum computing system.

With reference now to the FIGS., example embodiments of the present disclosure will be discussed in further detail. As used here, the use of the term "about" in conjunction with a value refers to within 20% of the value.

FIG. 1 depicts an example quantum computing system 100. The system 100 is an example of a system of one or more classical computers and/or quantum computing devices in one or more locations, in which the systems, components, and techniques described below can be implemented. Those of ordinary skill in the art, using the disclosures provided herein, will understand that other quantum computing devices or systems can be used without deviating from the scope of the present disclosure.

The system 100 includes quantum hardware 102 in data communication with one or more classical processors 104. The classical processors 104 can be configured to execute computer-readable instructions stored in one or more memory devices to perform operations, such as any of the operations described herein. The quantum hardware 102 includes components for performing quantum computation. For example, the quantum hardware 102 includes a quantum system 110, control device(s) 112, and readout device(s) 114 (e.g., readout resonator(s)). The quantum system 110 can include one or more multi-level quantum subsystems, such as a register of qubits (e.g., qubits 120). In some implementations, the multi-level quantum subsystems can include superconducting qubits, such as flux qubits, charge qubits, transmon qubits, gmon qubits, etc.

The type of multi-level quantum subsystems that the system 100 utilizes may vary. For example, in some cases it may be convenient to include one or more readout device(s) 114 attached to one or more superconducting qubits, e.g., transmon, flux, gmon, xmon, or other qubits. In other cases, ion traps, photonic devices or superconducting cavities (e.g., with which states may be prepared without requiring qubits) may be used. Further examples of realizations of multi-level quantum subsystems include fluxmon qubits, silicon quantum dots or phosphorus impurity qubits.

Quantum circuits may be constructed and applied to the register of qubits included in the quantum system 110 via multiple control lines that are coupled to one or more control devices 112. Example control devices 112 that operate on the register of qubits can be used to implement quantum gates or quantum circuits having a plurality of quantum gates, e.g., Pauli gates, Hadamard gates, controlled-NOT (CNOT) gates, controlled-phase gates, T gates, multi-qubit quantum gates, coupler quantum gates, etc. The one or more control devices 112 may be configured to operate on the quantum system 110 through one or more respective control parameters (e.g., one or more physical control parameters). For example, in some implementations, the multi-level quantum subsystems may be superconducting qubits and the control devices 112 may be configured to provide control pulses to control lines to generate magnetic fields to adjust the frequency of the qubits.

The quantum hardware 102 may further include readout devices 114 (e.g., readout resonators). Measurement results 108 obtained via measurement devices may be provided to the classical processors 104 for processing and analyzing. In some implementations, the quantum hardware 102 may include a quantum circuit and the control device(s) 112 and readout devices(s) 114 may implement one or more quantum logic gates that operate on the quantum hardware 102 through physical control parameters (e.g., microwave pulses) that are sent through wires included in the quantum hardware 102. Further examples of control devices include arbitrary waveform generators, wherein a DAC (digital to analog converter) creates the signal.

The readout device(s) 114 may be configured to perform quantum measurements on the quantum system 110 and send measurement results 108 to the classical processors 104. In addition, the quantum hardware 102 may be configured to receive data specifying physical control qubit parameter values 106 from the classical processors 104. The quantum hardware 102 may use the received physical control qubit parameter values 106 to update the action of the control device(s) 112 and readout devices(s) 114 on the quantum system 110. For example, the quantum hardware 102 may receive data specifying new values representing voltage strengths of one or more DACs included in the control devices 112 and may update the action of the DACs on the quantum system 110 accordingly. The classical processors 104 may be configured to initialize the quantum system 110 in an initial quantum state, e.g., by sending data to the quantum hardware 102 specifying an initial set of parameters 106.

In some implementations, the readout device(s) 114 can take advantage of a difference in the impedance for the |0⟩ and |1⟩ states of an element of the quantum system, such as a qubit, to measure the state of the element (e.g., the qubit). For example, the resonance frequency of a readout resonator can take on different values when a qubit is in the state |0⟩ or the state |1⟩, due to the nonlinearity of the qubit. Therefore, a microwave pulse reflected from the readout device 114 carries an amplitude and phase shift that depend on the qubit state. In some implementations, a Purcell filter can be used in conjunction with the readout device(s) 114 to impede microwave propagation at the qubit frequency.

In some embodiments, the quantum system 110 can include a plurality of qubits 120 arranged, for instance, in a two-dimensional grid 122. For clarity, the two-dimensional grid 122 depicted in FIG. 1 includes 4×4 qubits, however in some implementations the system 110 may include a smaller or a larger number of qubits. In some embodiments, the multiple qubits 120 can interact with each other through multiple qubit couplers, e.g., qubit coupler 124. The qubit couplers can define nearest neighbor interactions between the multiple qubits 120. In some implementations, the strengths of the multiple qubit couplers are tunable parameters. In some cases, the multiple qubit couplers included in the quantum computing system 100 may be couplers with a fixed coupling strength.

In some implementations, the multiple qubits 120 may include data qubits, such as qubit 126 and measurement qubits, such as qubit 128. A data qubit is a qubit that participates in a computation being performed by the system

100. A measurement qubit is a qubit that may be used to determine an outcome of a computation performed by the data qubit. That is, during a computation an unknown state of the data qubit is transferred to the measurement qubit using a suitable physical operation and measured via a suitable measurement operation performed on the measurement qubit.

In some implementations, each qubit in the multiple qubits 120 can be operated using respective operating frequencies, such as an idling frequency and/or an interaction frequency and/or readout frequency and/or reset frequency. The operating frequencies can vary from qubit to qubit. For instance, each qubit may idle at a different operating frequency. The operating frequencies for the qubits 120 can be chosen before a computation is performed.

FIG. 1 depicts one example quantum computing system that can be used to implement the methods and operations according to example aspects of the present disclosure. Other quantum computing systems can be used without deviating from the scope of the present disclosure.

Figure 2:
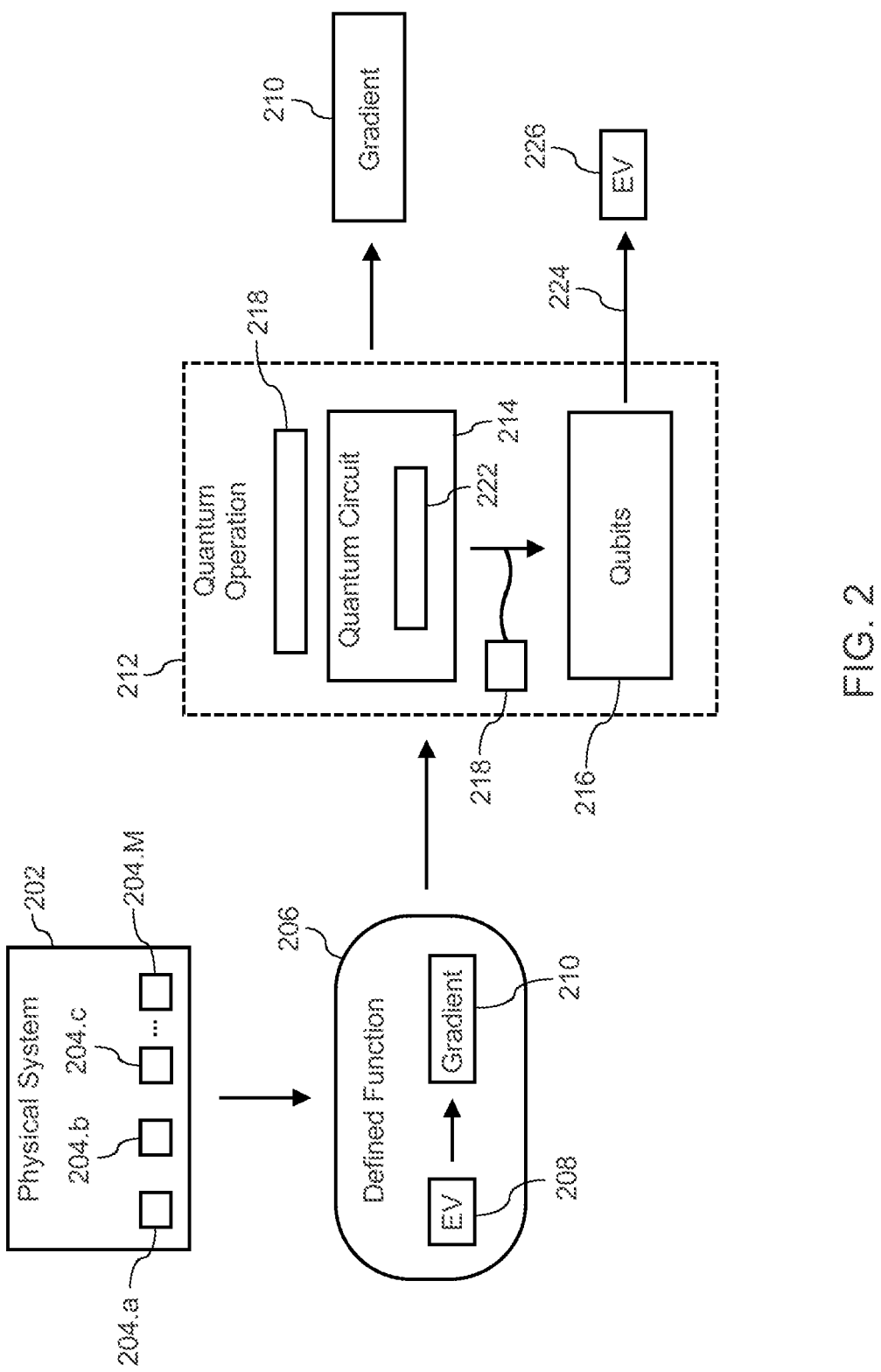
FIG. 2 depicts an overview of systems and methods according to example embodiments of the present disclosure.

FIG. 2 depicts an overview of systems and methods according to example embodiments of the present disclosure. As shown, aspects of the present disclosure may simulate experiments of a physical system 202 using, for instance, a quantum computing system. The physical system may have M quantum observables, such as quantum observable 204.*a*, 204.*b*, 204.*c*, . . . 204.M. In some examples, the quantum observables may include, for instance, dipole moment and polarizability, electron density, forces experienced by classical nuclei, or other properties associated with a ground state. A defined function 206 may be generated that encodes expectation values 208 for each of the M quantum observables 204.*a*, 204.*b*, 204*c*, . . . 204*d* as a gradient 210 of the defined function.

A quantum operation 212 may be performed by implementing a quantum circuit 214 on one or more qubit(s) 216 of a quantum computing system. The quantum operation 212 may be operable to determine the gradient 210 of the defined function 206. For instance, the quantum operation 212 may be operable to determine the gradient 210 using the Gilyén quantum gradient algorithm 218. The quantum circuit 214 may implement a plurality of state preparation operations 220 on the qubit(s) 216. The quantum circuit 214 may implement a probability oracle 222 for the defined function 206. An example quantum circuit 214 is discussed with reference to FIG. 3.

Referring to FIG. 2, the expectation value(s) 226 for the M quantum observables 204.*a*, 204.*b*, 204.*c*, . . . 204.M may be determined after implementation of the quantum operation 212. For instance, the expectation value(s) 226 for the M quantum observables 204.*a*, 204.*b*, 204.*c*, . . . 204.M may be obtained based at least in part on a measurement 224 of the qubit(s) 216.

FIG. 3 depicts an example quantum circuit 214 according to example embodiments of the present disclosure. The quantum circuit 214 can be implemented on one or more qubits in a quantum computing system, such as the quantum computing system depicted in FIG. 1. The quantum circuit 214 can implement a probability oracle for the defined function for measuring observables that happen to act on disjoint qubits. The quantum circuit 214 includes M registers of first qubits 302, 304, 306, a register of N second qubits 308, and an ancilla qubit 310. The M registers of first qubits 302, 304, and 306 include b bits (e.g, 4 bits) of precision per parameter. The ovals 312 represent input values for the defined function. The ovals 314 represent zero-initialized qubits on the register of N second qubits 308. The block 316 indicates the state preparation unitary for preparing the state of the register of N second qubits 308 to simulate the physical system. The ancilla qubit 310 encodes the values of the defined function in its amplitudes The gates 318 and 320 on the ancilla qubit 310 represent Hadamard and phase gates for a Hadamard test on the ancilla qubit. The series of ovals represent doubly-controlled gates 322 that implement time evolution by the observables, which act on the M registers of first qubits 302, 304, and 306. Each series of gates 322 act on the M registers of first qubits 302, 304, and 306 respectively and correspond to a different observable. Rotation angles within a series of gates vary by powers of two from gate to gate.

FIG. 4 depicts a flow diagram of an example method 400 for operating one or more qubits in a quantum computing system according to example embodiments of the present disclosure. The method 400 can be implemented using any suitable quantum computing system, such as the system described in FIG. 1. As used herein, the term "computing devices" can refer to a classical computing device, quantum computing device, or combination of classical and quantum computing devices. FIG. 4 depicts operations performed in a particular order for purposes of illustration and discussion. Those of ordinary skill in the art, using the disclosures provided herein, will understand that operations of any of the methods described herein can be expanded, include steps not illustrated, omitted, rearranged, and/or modified in various ways without deviating from the scope of the present disclosure.

At 402, the method 400 includes accessing or obtaining a defined function associated with the physical system to be simulated by the quantum computing system. The defined function can encode an estimated value of at least one property to be simulated by the quantum computing system as a gradient of the defined function.

At 404, the method 400 can implement a quantum circuit on a plurality of qubits in the quantum computing system to perform a quantum operation on the plurality of qubits. The quantum operation can be operable to determine the gradient of the function. For instance, in some embodiments, the quantum operation can include the Gilyén quantum gradient algorithm.

At 406, the method 400 can determine an estimated value for at least one property based at least in part on a measurement of at least one of the plurality of qubits after implementation of the quantum operation. For instance, in some embodiments, the estimated value(s) can include expectation value(s) of observables in a physical system (e.g., a quantum system). In some embodiments, the estimated value(s) can include elements associated with time dependent correlation functions.

Implementations of the digital, classical, and/or quantum subject matter and the digital functional operations and quantum operations described in this specification can be implemented in digital electronic circuitry, suitable quantum circuitry or, more generally, quantum computational systems, in tangibly-implemented digital and/or quantum computer software or firmware, in digital and/or quantum computer hardware, including the structures disclosed in this specification and their structural equivalents, or in combinations of one or more of them. The term "quantum computing systems" may include, but is not limited to, quantum computers/computing systems, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits/qubit structures, or a combination of one or more of them. Alternatively or in addition, the program instructions can be encoded on an artificially-generated propagated signal that is capable of encoding digital and/or quantum information (e.g., a machine-generated electrical, optical, or electromagnetic signal) that is generated to encode digital and/or quantum information for transmission to suitable receiver apparatus for execution by a data processing apparatus.

The terms quantum information and quantum data refer to information or data that is carried by, held, or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states (e.g., qudits) are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, or multiple digital and quantum processors or computers, and combinations thereof. The apparatus can also be, or further include, special purpose logic circuitry, e.g., an FPGA (field programmable gate array), or an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital or classical computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL, Quipper, Cirq, etc.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers or processors to be "configured to" or "operable to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum microprocessors or both, or any other kind of central digital and/or quantum processing unit. Generally, a central digital and/or quantum processing unit will receive instructions and digital and/or quantum data from a read-only memory, or a random access memory, or quantum systems suitable for transmitting quantum data, e.g. photons, or combinations thereof.

Some example elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, or optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more tangible, non-transitory machine-readable storage media, and that are executable on one or more digital and/or quantum processing devices. The systems described in this specification, or portions of them, can each be implemented as an apparatus, method, or electronic system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:

implementing, by one or more computing devices, a quantum circuit on a plurality of qubits in a quantum computing system to perform a quantum operation on the plurality of qubits, the quantum operation operable to compute a gradient of a defined function encoding an estimated value of at least one property of a physical system to be simulated by the quantum computing system as a gradient of the defined function, wherein the quantum circuit encodes the defined function into one or more amplitudes of one or more ancilla qubits; and measuring, after implementing the quantum operation, one or more qubits of the plurality of qubits to obtain one or more measurement values, wherein the one or more measurement values correspond to the estimated value of the at least one property.

2. The method of claim 1, wherein the at least one property to be simulated comprises an expectation value of a quantum observable of the physical system.

3. The method of claim 1, wherein the at least one property to be simulated comprises one or more elements associated with unequal time correlation functions.

4. The method of claim 1, wherein the quantum operation is operable to determine the gradient of the defined function using a Gilyén quantum gradient algorithm.

5. The method of claim 1, wherein implementing, by the one or more computing devices, a quantum circuit comprises: implementing, by the one or more computing devices, a plurality of state preparation operations on at least a subset of the plurality of qubits using the quantum circuit.

6. The method of claim 1, where in the quantum circuit implements a probability oracle for the defined function.

7. The method of claim 1, wherein the quantum circuit is implemented on M first qubit registers, a system register of N second qubits, and the one or more ancilla qubits, where M is a number of quantum observables and N is an integer.

8. The method of claim 7, wherein the quantum circuit implements a Hadamard test on the one or more ancilla qubits using one or more Hadamard gates and one or more phase gates.

9. The method of claim 7, wherein the N second qubits are initialized to zero, the quantum circuit operable to implement a state preparation unitary on the N second qubits.

10. The method of claim 7, wherein the quantum circuit implements a controlled time evolution for the quantum observables using at least one doubly controlled quantum gate on the M first qubit registers.

11. The method of claim 10, wherein the at least one doubly controlled quantum gate is based at least in part on one of the N second qubits and the one or more ancilla qubits.

12. A quantum computing system, comprising:

a plurality of qubits, the plurality of qubits comprising M registers of first qubits, a register of N second qubits, and one or more ancilla qubits, and one or more control devices configured to implement a quantum circuit on the plurality of qubits to compute a gradient of a defined function using a quantum operation, wherein the gradient of the defined function encodes estimated values of a property to be simulated by the quantum computing system, wherein the quantum circuit encodes the defined function into one or more amplitudes of the one or more ancilla qubits.

13. The quantum computing system of claim 12, wherein the property comprises expectation values of a plurality of observables of a physical system.

14. The quantum computing system of claim 12, wherein the property comprises one or more elements associated with unequal time correlation functions.

15. The quantum computing system of claim 12, wherein the quantum operation is operable to compute the gradient of the defined function using a Gilyén quantum gradient algorithm.

16. The quantum computing system of claim 12, wherein the quantum circuit implements a Hadamard test on the one or more ancilla qubits using one or more Hadamard gates and one or more phase gates.

17. The quantum computing system of claim 12, wherein the N second qubits are initialized to zero, the quantum circuit operable to implement a state preparation unitary on the N second qubits, wherein the quantum circuit implements a controlled time evolution for the quantum observable using at least one doubly controlled quantum gate on the M registers of first qubits, the at least one doubly controlled quantum gate is based at least in part on one of the N second qubits and the one or more ancilla qubits, and further comprising one or more measurement devices configured to perform a measurement of at least one of the M registers of first qubits.

* * * * *